No. 669,218. Patented Mar. 5, 1901.
H. HIRST.
ELECTRIC RAILWAY.
(Application filed Jan. 29, 1901.)
(No Model.)
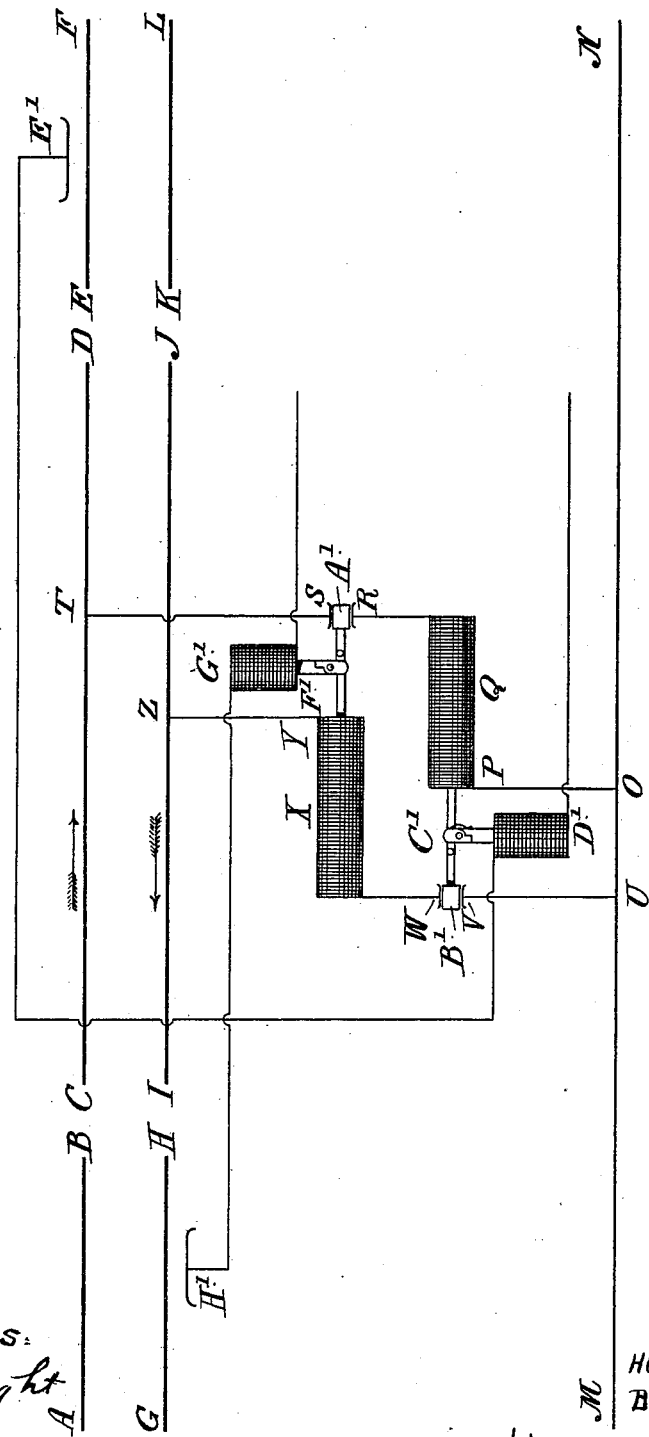
WITNESSES:
F.W.Wright
S.C. Connor
INVENTOR
HUGO HIRST
BY
Howson and Howson
HIS ATTORNEYS

UNITED STATES PATENT OFFICE.

HUGO HIRST, OF LONDON, ENGLAND.

ELECTRIC RAILWAY.

SPECIFICATION forming part of Letters Patent No. 669,218, dated March 5, 1901.

Application filed January 29, 1901. Serial No. 45,248. (No model.)

*To all whom it may concern:*

Be it known that I, HUGO HIRST, gentleman, a subject of the Queen of Great Britain and Ireland, residing at 69 Queen Victoria street, in the city of London, England, have invented certain new and useful Improvements in or Connected with Electrical Tramways or Railways; and I do hereby declare the following to be a full, clear, and exact description of the invention, such as will enable others skilled in the art to which it appertains to make and use the same.

The object of my invention is to provide a means whereby the passage of an electrically-propelled vehicle over any given section of the tramway or railway can be caused to automatically prevent the passage of a vehicle over another section or other sections of the tramway or railway—for example, to prevent the passage of two vehicles in opposite directions at the same time over the same length of road on lengths of single line where a double line or passing place is not in view from the next double line or passing place, or on double lines where on account of narrowness of road or for other reason it is undesirable that two vehicles should be allowed to pass each other on parallel sections.

I will describe my invention with reference to the accompanying diagram, as arranged for preventing the passage of two vehicles in opposite directions, from which its general application will also be understood. I use a separate electrical conductor for the propulsion of the vehicles traveling in opposite directions, whether such vehicles run on the same track or on two parallel tracks and whether such conductors be parallel or otherwise disposed in relation to each other.

For the purpose of description I take three insulated sections of the electrical conductor from which vehicles traveling, say, to the right obtain their current, and I have marked these sections A B, C D, and E F on the accompanying diagram, and I take also three other insulated sections of the conductor parallel to the first three and from which vehicles traveling, say, to the left take their current, and I have marked these last-named three sections G H, I J, and K L on the accompanying diagram, and I presume it to be desired to prevent the possibility of a vehicle on the section I J being supplied with current while another vehicle is on the section C D, and vice versa. A feeder M N supplies current to the sections A B, E F, G H, and K L, and a conductor O T (which I will call the "first" conductor) supplies current from the feeder to the section C D through a solenoid Q or electromagnetic device, and a conductor U Z (which I will call the "second" conductor) similarly supplies current to the section I J through another solenoid X or electromagnetic device. A switch is arranged in each conductor to be acted upon by the solenoid or electromagnetic device in the other conductor, so that when current is passing through the solenoid or electromagnetic device of either of the conductors the continuity of the other conductor is broken by the switch therein, while at other times it is kept closed, which may be done by a spring or equivalent device.

Under normal conditions when no vehicle is traveling over the sections C D and J I no current is passing through either solenoid or electromagnetic device, and consequently the continuity of both conductors is maintained. If a vehicle enter the section C D, current immediately passes through the solenoid Q or electromagnetic device of the first conductor and the switch in the second conductor is operated by the contact-piece B' being withdrawn from between the contacts W V, and so the continuity of that conductor is broken and remains broken so long as current is being taken off the section C D, and consequently a vehicle is unable to proceed along the section I J, as no current is supplied to that section. Directly the vehicle on section C D passes out of that section the circuit is broken and current ceases to flow through the solenoid Q or electromagnetic device of the first conductor and the continuity of the second conductor is reëstablished by the switch therein and current is available on the section J I for the propulsion of the vehicle on that section, and this current through the solenoid or electromagnetic device in this second conductor operates the switch in the first conductor by the contact-piece A' being withdrawn from between the contacts S R, and so the continuity of that conductor is broken and remains broken so long as current is being taken from the section J I, and consequently no vehicle can proceed along the section C D until the vehicle has left the section J I.

In some cases a vehicle in either section C D or J I may require to be stopped or may be able to proceed by momentum, so that the connection with the return through the motors is broken before the vehicle leaves the section, and therefore current ceases to flow through the solenoid or electromagnetic device in the conductor of such section and a vehicle can then be supplied with energy on the other section while the vehicle is still on the first section. To provide against this, catches (indicated at C' and F') may be employed, so arranged that when either of the switches is operated by the solenoids or electromagnetic devices the said switch is retained by the catch in the off position, and until the catch is released the continuity of the corresponding conductor remains broken and current cannot flow until the switch is released. The catches may each be operated by a solenoid D' G' or electromagnetic device, so that when current flows through either of the said solenoids or electromagnetic devices the catch which it controls is operated to release the corresponding switch and the continuity of the conductor which the switch controls is restored. I have shown the catches as consisting of pieces at the ends of the cores of the solenoids D' G', hinged so that they will yield under the pressure of a pin on the core of the respective solenoid X or Q, but will not yield in the reverse direction, so that when the pin passes the hinged piece it falls back and constitutes an obstruction to the said pin and so prevents the return of the core to complete the circuit through the switch S R or W V until the catch C' or F' is withdrawn by the solenoid D' or G'; but I do not limit myself to this form of catch.

At a convenient point on the sections of the conductor, which vehicles traveling from the sections C D and I J, respectively, enter after leaving either of those sections—that is to say, the sections E F and G H, respectively—I provide a switch or contact maker E' H', one end of the conductor operating the catch-solenoids D' G' or electromagnetic devices being connected with these switches or contact-makers, respectively, and the other end being taken to earth or to the return-conductor, where an insulated return-circuit is used. These switches or contact-makers may be operated mechanically, so as to admit current to the catch-solenoids or electromagnetic devices to release the respective catches when the collector on the vehicles passes the said switches or contact-makers; but I preferably arrange the said switches or contact-makers so that they press against the trolley wheel or brush of the collector on the vehicle and allow current to flow from the line through the said trolley wheel or brush and the switch or contact-maker and to the catch-solenoid or electromagnetic device to release the catch. In connection with these switches or contact-makers I can employ a discharge-resistance to minimize the inductive spark consequent on breaking contact.

When the electrical sections are of considerable length, I can, if desired, use "relays."

It will be understood that the arrangement may be applied to sections of lines arranged otherwise than parallel to each other, as illustrated in the diagram.

Having now particularly described and ascertained the nature of this invention and in what manner the same is to be performed, I declare that what I claim is—

1. In electrical tramways, or railways, the combination with sections, or lengths, of line along which it is desired that vehicles shall not run simultaneously, of conductors from the feeder, a separate conductor being used for each section, or length, of line, and each conductor being provided with a solenoid, or electromagnetic device operated by current passing therethrough so as to break the electric circuit through the other conductor; substantially as hereinbefore described.

2. In electrical tramways, or railways the combination with sections or lengths, of line along which it is desired that vehicles shall not run simultaneously, of conductors from the feeder, a separate conductor being used for each section or length, of line, and each conductor being provided with a solenoid, or electromagnetic device, operated by current passing therethrough so as to break the electric circuit through the other conductor, and a retaining device for each such solenoid, or electromagnetic device, and means for sending current through to release such retaining devices by means of the vehicle when it reaches an adjacent section, or length, of line; substantially as hereinbefore described.

In testimony whereof I affix my signature in presence of two witnesses.

HUGO HIRST.

Witnesses:
ERNEST WILSON,
WILLIAM GERALD REYNOLDS.